United States Patent Office 2,994,434
Patented Aug. 1, 1961

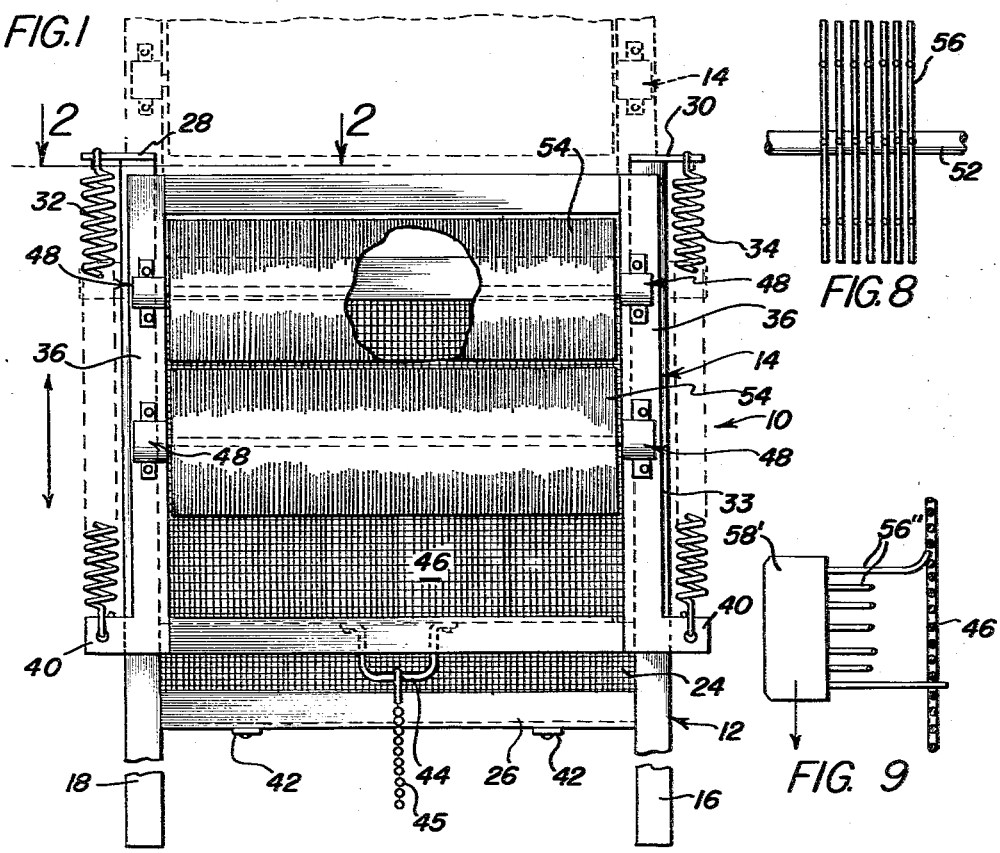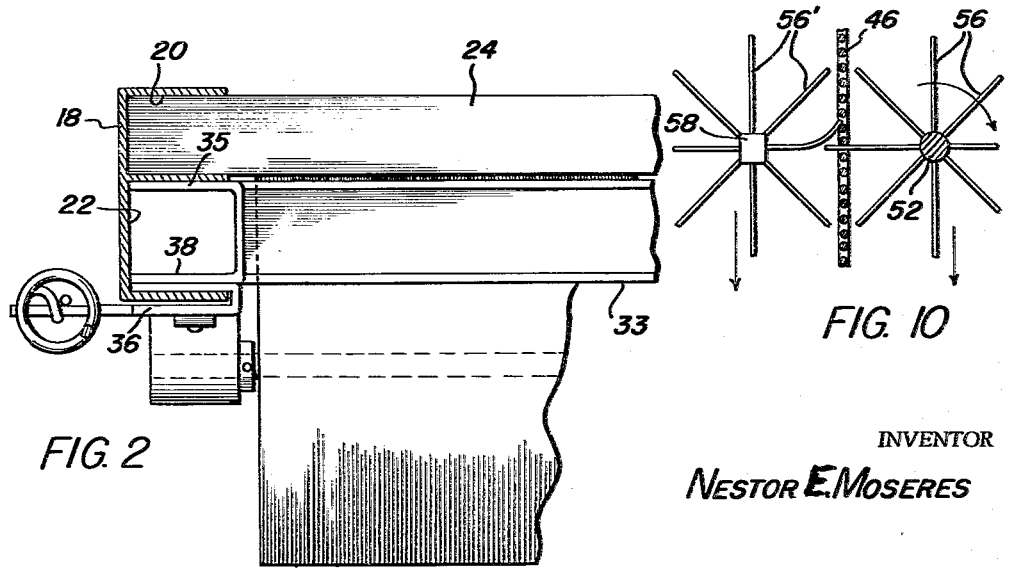

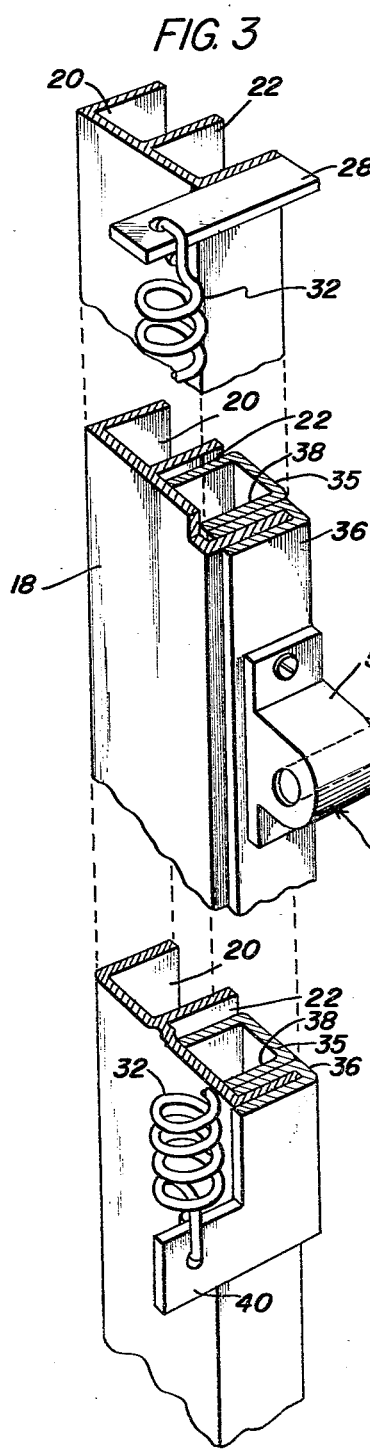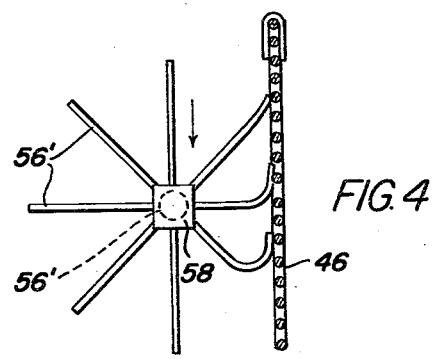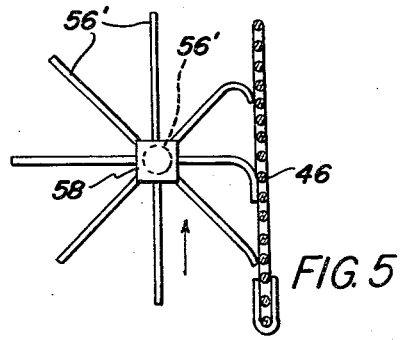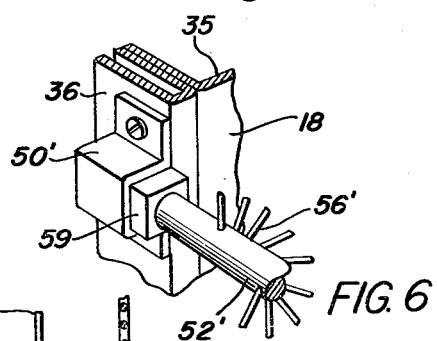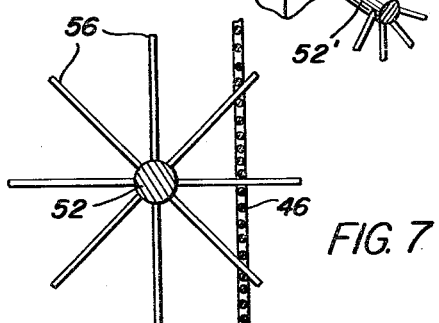

2,994,434
FILTER OR SCREEN CLEANING ASSEMBLY
Nestor E. Moseres, Carrera 67 #40—75, Apartado Aereo 2666, Barranquilla, Colombia
Filed Oct. 29, 1959, Ser. No. 849,503
8 Claims. (Cl. 210—413)

This invention relates generally to the maintenance of filters or screens and is particularly concerned with an improved cleaner traversable across the face of the screen or filter for periodically cleaning the same.

Most heating and air conditioning systems, and generally any system in which air is moved, usually includes a filter in which minute particles of debris such as dust, hair or the like collects. Periodically, in order to retain efficiency in the system, the filter must be replaced or cleaned by washing, or brushing, this procedure generally entailing the removal of the filter per se and involves a relatively dirty job, and often is neglected since the filter may be disposed in an inaccessible position.

A primary object of the invention is to provide a screen or filter in combination with traversing brush means whereby the filter or screen may be periodically cleaned without removal from situ.

A further object of the invention is to provide in the combination set forth, brush means which will traverse and/or penetrate the openings of a screen-like filter for periodically cleaning the same.

And yet another object of the invention is to provide a traversing cleaner for a screen or filter whereby both sides of a filter may be cleaned.

Although the invention in its preferred embodiment is shown with a traversing cleaner, the filter may traverse a fixed cleaner and such an expedient is contemplated within the purview of the invention.

A still further object of the invention is to provide a filter or screen cleaning assembly which is readily and economically manufactured and installed, easily used, and highly practical for the purpose intended.

Other objects and advantages of this invention will become apparent from a consideration of the following description, taken in connection with the accompanying drawings, wherein an embodiment of this invention is disclosed by way of example.

In the drawings:

FIGURE 1 is a front elevation of the novel assembly showing a filter screen and traversing cleaner; this structure being shown removed from an air conditioning or heating system in which it would be incorporated, portions being broken away, and showing by dotted lines the normal position of the parts;

FIGURE 2 is an enlarged fragmentary section taken on line 2—2 of FIGURE 1;

FIGURE 3 is a further enlarged fragmentary perspective view of one side of the novel assembly showing details of construction;

FIGURE 4 is a diagrammatic side elevation showing substantially the position of bristle elements when the brush of the traversing assembly is moved down across the face of a screen member;

FIGURE 5 is a view similar to FIGURE 4 showing the traversing assembly moving upwardly;

FIGURE 6 is an enlarged fragmentary perspective view showing an alternative mounting for the traversing brush means of the invention;

FIGURE 7 is a side elevation similar to FIGURE 4 showing how the bristle elements of a brush rotatable about its longitudinal axis would penetrate a filter or screen as it is traversed thereacross.

FIGURE 8 is a fragmentary elevation of a portion of a brush showing how the bristles may be disposed in co-planar relation as compared with the spiral or helical disposition of FIGURE 6;

FIGURE 9 is a diagrammatic side elevation of a still further embodiment of traversing brush; and FIGURE 10 is a diagrammatic side elevation of traversing brush means engageable on both sides of a filter or screen member.

Referring to the drawings in detail and first considering FIGURES 1–3, a novel filter or screen assembly is indicated generally at 10 and comprises a filter support frame 12 and traversing cleaner 14.

The support frame 12 includes vertically extending legs 16 and 18 having a bi-channel cross section providing parallel guide slots or grooves 20 and 22; see FIGURES 2 and 3, and since both legs are the same only leg 18 is illustrated in detail. The slots 20 of the legs will removably receive therein the frame of a conventional filter 24 which must be periodically cleaned. A transverse channel 26 extends between the legs 16 and 18 to orient the filter at the intake of the system in which it will be incorporated.

The legs 16 and 18 include laterally extending plate elements 28 and 30 which are transversely apertured and receive one end of tension springs 32 and 34 which retain the cleaner 14 in its normal position shown partially by dotted lines in FIGURE 1.

The traversing cleaner 14 comprises an inverted U-shaped frame 33 having legs 35 reciprocably received in the grooves 22 and having secured at one side thereof a U-shaped channel element 36 received on the flange 38 of the legs. The channel element 36 has projecting laterally from one side thereof at their lower ends, an apertured plate 40 to which the lower ends of the springs 32 and 34 are anchored. The channel 26 includes on its lower surface pivotal stop elements 42 which may be disposed in the path of travel of the frame 33 to limit its downward travel. The elements 42 may be pivoted beneath the channel 26 out of the path of travel of the frame 33 to facilitate removal or adjustment of the brushes therefrom as will become subsequently apparent.

The channel 36 has secured thereto a depending handle 44 to which a chain 45 may be secured if the assembly is disposed in a relatively high and inaccessible position.

Although not shown, suitable debris-catching means will be located beneath the assembly 10 to catch dirt and the like when it is dislodged from the filter.

The filter 24 includes a foraminous screen 46 of any suitable character, this being disclosed substantially diagrammatically in FIGURES 4, 5, 9 and 10. The frame 33 has mounted on the outer surface of the channel element 36 brush mounting means 48 comprising screw retained bearings 50 which receive therein the terminal ends of the shaft 52 of a rotatable cylindrical brush 54. The brush 54 extends substantially the width of the filter screen 46, and as the frame 33 is drawn downwardly from the dotted line position of FIGURE 1 toward and beyond the solid line position shown thereon, the bristle elements 56, see FIGURE 7, will progressively penetrate the screen 46 and clean the transverse apertures thereof. FIGURE 7, it will be understood is diagrammatic and the bristle elements will be much thicker on the shaft 52 so that all of the apertures may be brushed and cleaned.

The bristle elements 56' may be disposed in either spiral or helical relationship along their supporting shaft 52', as seen in FIGURE 6, or longitudinally in spaced relation as shown in FIGURE 8. Additionally, if the brush is of the non-rotating type to subsequently be described, it may be of linear construction as seen in FIGURE 9, comprising a back 58' having protruding bristles 56''.

As seen in FIGURE 6, a spiral non-rotating brush is utilized, where the shaft 52' includes terminal, rectangular blocks 59 which are received in suitably conformed, screw retained sockets 50'. This construction facilitates periodic, 90 degree rotation of the brush after a circumferential portion has become worn.

In FIGURE 1, a pair of brushers 54 are disclosed in tandem and one of them may be the non-rotating type which has a bristle action similar to that disclosed in FIGURES 4 and 5, and the other may rotate as disclosed in FIGURE 7.

Since the air generally moves in only one direction, usually the major portion of material could be removed from the screen 46 by sweeping the traversing brush across only one side of the screen. However, the combination of brushes shown in FIGURE 10 may be used where one brush is rotary and the other is fixed.

Although the rotary brush is illustrated as extending through the screen apertures, it will be appreciated that the screen will also be brushed as the bristles are flexed in somewhat the manner illustrated in FIGURES 4 and 5.

Thus there has been disclosed a device fully conforming with the objects of invention, and the manner of operation and specific details of construction are believed readily apparent from the foregoing and thus further description is believed to be unnecessary.

Although particular embodiments of the invention have been illustrated and described, changes and modifications will be apparent to those skilled in the art. All changes and modifications falling within the scope of the appended claims are intended to be claimed.

I claim:

1. In combination, a plate-like, planar, screen member having a plurality of transverse apertures normal to its general plane for receiving fluid therethrough and filtering debris entrained therein, and at least one brush means having relative planar movement to said screen member across the general plane thereof and normal to said transverse apertures, said brush means including bristle portions engageable at and protruding through said apertures for removing debris accumulated thereat due to relative movement between said brush means and screen member, said brush means comprising a support frame reciprocable in parallel relation to said screen member, and means normally biasing said brush means toward one edge of said screen member and permitting traversing, planar movement relative thereto, said bristle portions comprising a cylindrical brush secured in fixed relation on said support frame for linear and penetrating contact with said screen member, and brush mounting means on said support frame, said brush mounting means including portions orienting said brush at a fixed position relative to said frame and permitting partial rotation of said brush about its longitudinal axis to permit different circumferential portions of said brush to successively engage and penetrate through said screen member.

2. In combination, a filter cleaning assembly comprising in combination a plate like, planar, filter member, guide means disposed parallel to said filter member, traversing brush means reciprocably supported in said guide means for planar relative movement across the face of said filter and removing debris collected thereon, said filter member being vertically disposed, spring means extending between said filter and brush means for returning the same to a normal position after it has been drawn across the filter member, handle means on said assembly for manually causing relative movement between said brush means and filter against reaction of said spring means, said brush means comprising a bristle portion disposed transversely of and protruding through at least one side of said filter member, said brush means comprising at least one cylindrical brush journaled for rotation about its longitudinal axis across the one side of said filter member, said bristle portions penetrating the filter member as said brush means rotates.

3. The structure of claim 2; and second brush means engaged with said filter member at the side opposite that engaged by said first brush means.

4. The structure of claim 2; and second brush means parallel to said first brush means, movable therewith and disposed in tandem relationship thereto across the face of said filter member.

5. In combination, a filter cleaning assembly comprising a support frame, a planar filter member removably supported in said support frame and including transverse apertures therethrough upon which debris will accumulate, said frame including guide means parallel to said filter member and at opposite margins thereof, brush support means reciprocably supported in said guide means, spring means between said brush support means and support frame normally urging said brush support means toward the upper end of said support frame, a cylindrical brush journaled on said brush support means parallel to the planar filter member and having a radially disposed bristle portion projecting through adjacent transverse apertures in said filter member and having rolling engagement through other transverse apertures as the brush support means is moved parallel to said filter member against the normal force of said spring means.

6. The structure of claim 5; said brush support means including depending, manually engageable force transmitting means for moving said brush support means with respect to said filter member.

7. The combination of claim 1; including a second brush means opposed to said first mentioned brush means and engageable at the opposite side of said screen member.

8. The structure of claim 5; said brush means being traversible across both sides of said filter member.

References Cited in the file of this patent

UNITED STATES PATENTS

| | | |
|---|---|---|
| 576,971 | Taylor | Feb. 9, 1897 |
| 1,483,667 | Landreth et al. | Feb. 12, 1924 |
| 1,959,491 | Moran | May 22, 1934 |
| 2,055,394 | Thomas | Sept. 22, 1936 |
| 2,082,991 | Turco | June 8, 1937 |